(12) United States Patent
Nakhjavani et al.

(10) Patent No.: US 10,042,962 B2
(45) Date of Patent: Aug. 7, 2018

(54) MID-SURFACE EXTRACTION FOR FINITE ELEMENT ANALYSIS

(71) Applicant: The Boeing Company, Seal Beach, CA (US)

(72) Inventors: Omid B. Nakhjavani, Mukilteo, WA (US); James S. Lee, Woodinville, WA (US); Gregory M. Anderson, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 1042 days.

(21) Appl. No.: 14/282,236

(22) Filed: May 20, 2014

(65) Prior Publication Data

US 2015/0339409 A1    Nov. 26, 2015

(51) Int. Cl.
*G06F 17/50*    (2006.01)
*G06T 17/00*    (2006.01)
(Continued)

(52) U.S. Cl.
CPC .......... *G06F 17/50* (2013.01); *G06F 17/5018* (2013.01); *G06T 17/00* (2013.01);
(Continued)

(58) Field of Classification Search
CPC ..... G06F 17/50; G06F 17/5018; G06T 17/00; G06T 17/10; G06T 19/00
(Continued)

(56) References Cited

U.S. PATENT DOCUMENTS

| | | | | |
|---|---|---|---|---|
| 4,797,842 A | * | 1/1989 | Nackman | G06F 17/5018 345/420 |
| 4,989,257 A | * | 1/1991 | Horowitz | G06K 9/46 382/192 |

(Continued)

FOREIGN PATENT DOCUMENTS

WO    WO 2007143080 A2 *  12/2007  ............ G06T 17/10

OTHER PUBLICATIONS

Lee et al. ("Graph-based midsurface extraction for finite element analysis", IEEE, 2007, pp. 1055-1058).*

(Continued)

*Primary Examiner* — Omar Fernandez Rivas
*Assistant Examiner* — Iftekhar Khan
(74) *Attorney, Agent, or Firm* — Womble Bond Dickinson (US) LLP

(57) ABSTRACT

An apparatus is provided for implementation of a mid-surface modeler including a receiver, selector, clusterer and mid-surface constructor. The receiver is to receive a solid model of a structural product composed of structural components, with the solid model representing the components by a collection of geometry. The selector is to select a group of geometry from the geometry in the solid model, with the group of geometry having approximately the same shape, and being perpendicular to an axis of a local coordinate system. The clusterer is to cluster geometry of the group of geometry into one or more clusters of geometry based on a relationship between the geometry, with each cluster of the cluster(s) representing a component of the component(s). And the mid-surface constructor is to construct a mid-surface model of the product, including computation of respective one or more mid-surfaces for the cluster(s).

20 Claims, 7 Drawing Sheets

(51) Int. Cl.
    *G06T 17/10*    (2006.01)
    *G06T 19/00*    (2011.01)
(52) U.S. Cl.
    CPC .............. *G06T 17/10* (2013.01); *G06T 19/00* (2013.01); *G06F 17/5095* (2013.01); *G06F 2217/16* (2013.01)
(58) Field of Classification Search
    USPC .......................................................... 703/1
    See application file for complete search history.

(56) References Cited

U.S. PATENT DOCUMENTS

| | | | | |
|---|---|---|---|---|
| 5,038,291 | A * | 8/1991 | Wang | B29C 70/30 345/420 |
| 5,143,817 | A * | 9/1992 | Lawton | B29C 64/135 118/261 |
| 5,553,206 | A * | 9/1996 | Meshkat | G06T 17/20 345/419 |
| 6,044,210 | A * | 3/2000 | Nagtegaal | G06F 17/5018 703/2 |
| 6,100,893 | A * | 8/2000 | Ensz | G06T 17/20 345/420 |
| 6,392,647 | B1 * | 5/2002 | Migdal | G06T 17/20 345/423 |
| 6,445,390 | B1 * | 9/2002 | Aftosmis | G06T 17/20 345/420 |
| 6,704,693 | B1 * | 3/2004 | Fan | G06F 17/5018 700/98 |
| 6,804,635 | B1 * | 10/2004 | Dhondt | G06T 17/20 345/419 |
| 7,079,996 | B2 * | 7/2006 | Stewart | G06F 17/5018 345/419 |
| 7,430,499 | B2 * | 9/2008 | Rassaian | G06T 17/20 703/2 |
| 7,671,858 | B1 * | 3/2010 | Staten | G06T 17/10 345/419 |
| 7,840,386 | B2 * | 11/2010 | Rassaian | G06F 17/5095 703/1 |
| 7,894,931 | B2 * | 2/2011 | Arai | B29C 45/76 264/328.12 |
| 8,229,712 | B2 * | 7/2012 | Hirata | G06F 17/5018 703/1 |
| 8,421,798 | B2 * | 4/2013 | Rameau | G06T 17/10 345/419 |
| 9,361,413 | B1 * | 6/2016 | Bout | G06F 17/5004 |
| 2003/0229476 | A1 * | 12/2003 | Naganarayana | G05B 17/02 703/1 |
| 2006/0103648 | A1 * | 5/2006 | Wu | G06F 17/5018 345/423 |
| 2006/0235660 | A1 * | 10/2006 | Chi | G06F 17/5018 703/2 |
| 2008/0002889 | A1 * | 1/2008 | Shimada | G06T 17/10 382/197 |
| 2008/0126047 | A1 * | 5/2008 | Lukis | G06F 17/505 703/9 |
| 2009/0192766 | A1 * | 7/2009 | Rodriguez | G06F 17/5018 703/1 |
| 2009/0271156 | A1 * | 10/2009 | Kageura | G06F 17/5018 703/1 |
| 2011/0129348 | A1 * | 6/2011 | Parkin | B29D 99/0025 416/230 |
| 2012/0310604 | A1 * | 12/2012 | Bazilevs | G06F 17/5018 703/1 |
| 2014/0222384 | A1 * | 8/2014 | Nordmark | G06F 17/5018 703/1 |
| 2016/0250812 | A1 * | 9/2016 | Roach | B29C 70/345 264/258 |

OTHER PUBLICATIONS

Lockett et al. ("Graph-based feature recognition for injection moulding based on a mid-surface approach", Elsevier, 2004, pp. 251-262).*

Sheffer, A. ( "Model simplification for meshing using face clustering", 2001, Computer-Aided Design, vol. 33, pp. 925-934).*

Krishnan Suresh ("Generalization of the Mid-Element Based Dimensional Reduction", ASME, 2003, pp. 308-314).*

Rezayat, M., ("Midsurface Abstraction from 3D Solids Models: General Theory and Applications," , 1996, Comput.-Aided Design, pp. 905-915).*

Ramanathan et al. ("Constructing medial axis transform of extruded and revolved 3D objects with free-form boundaries", Computer-Aided Design 37 (2005) 1370-1387).*

Low et al. ("Model Simplification Using Vertex-Clustering", ACM, 1997, pp. 75-81).*

Li et al., ("Hexahedral Meshing Using Midpoint Subdivision and Integer Programming", Comput. Methods Appl. Mech. Engng., 124, 171-193, 1995).*

Lee et al. ("Graph-based midsurface extraction for finite element analysis", IEEE, 2007).*

"Finite element method in structural mechanics," Wikipedia, The Free Encyclopedia, retrieved Mar. 25, 2014, from http://en.wikipedia.org/w/index.php?title=Finite_element_method_in_structural_mechanics&oldid=556633260, 6 pages.

Lockett et al., "Graph-Based Feature Recognition for Injection Moulding Based on a Mid-Surface Approach," Computer-Aided Design, vol. 37, Issue 2, Feb. 2005, 33 pages.

Sheen et al., "Solid Deflation Approach to Transform Solid Into Mid-Surface," Proceedings of TMCE 2008 Symposium, Apr. 2008, Izmir, Turkey, pp. 133-148.

* cited by examiner

MID-SURFACE EXTRACTION FOR FINITE ELEMENT ANALYSIS

TECHNOLOGICAL FIELD

The present disclosure relates generally to finite element analysis and, in particular, to extracting a mid-surface model from a solid model for finite element analysis.

BACKGROUND

Finite element analysis of computer models is an important tool in the design and verification of many engineered structural products and the structural components of which they are composed. For example, computer models may define a working environment in terms of forces, accelerations and the like, and can thus be stressed and analyzed determine structural integrity of an engineered structural product within that working environment. Through finite element analysis, it may be possible to break a complex system down into a manageable (finite) number of elements (e.g., a curve drawn as a series of steps). These computer models and their analysis may be used for several purposes, such as to help determine the behavior of a new airplane product design under various load environments.

Because of the interdisciplinary nature of finite element analysis (which typically combines concepts from mathematics, physics, engineering and computer science), generating an appropriate computer model and its analysis typically involves multiple phases. During one of these phases, a finite element analyst may use one or more computer programs to develop an appropriate computer model, sometimes referred to as a finite element model. In the case of a structural product, this may include creating a finite element mesh to divide the product's geometry into subdomains for mathematical analysis and applying material properties and boundary conditions to this geometry.

A finite element model (e.g., finite element mesh) of a structural product can be generated directly from a solid model of the product. But for a number of products, the solid model is unduly complex and requires excessive computing resources to generate a corresponding finite element model. In some instances, an intermediate mid-surface model of the product may be generated from the solid model, and this mid-surface model may then be used to generate the corresponding finite element model. But even in these instances, manual techniques for generating the mid-surface model often require an excessive amount of time; and other, automated techniques often produce inaccurate results that require excessive manual correction. It may therefore be desirable to have a system and method that addresses these challenges, and improves upon existing practices.

BRIEF SUMMARY

According to one aspect of example implementations, an apparatus is provided for implementation of a mid-surface modeler. The apparatus includes a processor and a memory storing executable instructions that in response to execution by the processor cause the apparatus to implement components of the system, including a receiver, selector, clusterer and mid-surface constructor that may be coupled to one another.

According to this aspect of example implementations, the receiver is configured to receive a solid model of a structural product composed of a plurality of structural components, with the solid model representing the plurality of structural components by a collection of geometry. The selector is configured to select a group of geometry from the geometry in the solid model, with the group of geometry being planar and perpendicular to an axis of a local coordinate system in which the solid model is defined. The clusterer is configured to cluster geometry of the group of geometry into one or more clusters of geometry based on a relationship between the geometry, with each cluster of the cluster(s) representing a structural component of the structural component(s). And the mid-surface constructor is configured to construct a mid-surface model of the structural product, including the mid-surface constructor being configured to compute respective one or more mid-surfaces for the cluster(s).

In some examples, the mid-surface constructor being configured to compute the respective mid-surface(s) may include for each cluster of the cluster(s) of geometry, being configured to average the geometry of the cluster.

In some examples, the memory may store further executable instructions that in response to execution by the processor cause the apparatus to further implement a collector. In these examples, the collector may be configured to collect additional geometry from the geometry in the solid model based on a relationship between the cluster(s) and additional geometry. Also in these examples, the mid-surface constructor being configured to construct the mid-surface model may include being configured to add an outline for the additional geometry to the respective mid-surface(s).

In some further examples, the mid-surface constructor being configured to add the outline for the additional geometry may include being configured to generate a projection of the additional geometry from the solid model onto a workspace of the mid-surface model including the respective mid-surface(s), with the projection being composed of a plurality of geometric shapes. The union of the geometric shapes may then be computed to obtain the outline for the additional geometry.

In some examples, the selector and clusterer may be configured to select the group and cluster geometry of the group into cluster(s) of geometry for each axis of a plurality of axes of the local coordinate system. In these examples, the mid-surface modeler being configured to construct the mid-surface model may include being configured to compute respective mid-surface(s) for the cluster(s) for each axis.

In some examples, the group of geometry may be a first group of geometry perpendicular to the axis being a first axis of the local coordinate system, and the respective mid-surface(s) may be first respective mid-surface(s). In these examples, the memory may store further executable instructions that in response to execution by the processor cause the apparatus to further implement a separator configured to remove the first group of geometry from the geometry in the solid model to produce a resulting solid model. The selector, then, may be further configured to select a second group of geometry from geometry in the resulting solid model, with the second group of geometry being planar and perpendicular to a second axis of the local coordinate system. The clusterer may be further configured to cluster geometry of the second group of geometry into a second one or more clusters of geometry based on a relationship between the geometry. And the mid-surface constructor may be further configured to further construct the mid-surface model of the structural product. This may include the mid-surface constructor being configured to compute second respective mid-surface(s) for the second cluster(s), with the mid-surface model including the first respective mid-surface(s) and second respective mid-surface(s).

In some examples, the apparatus may be for further implementation of a finite element analysis system that includes the mid-surface modeler. In these examples, the memory may store further executable instructions that in response to execution by the processor cause the apparatus to further implement at least a finite element modeler and processing system. The finite element modeler may be configured to generate a finite element model from the mid-surface model. And the processing system may be configured to perform a finite element analysis of the structural product from the finite element model.

In other aspects of example implementations, a method and computer-readable storage medium are provided for implementation of a mid-surface modeler. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
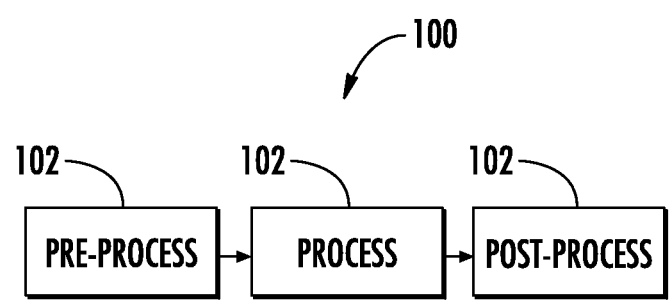
FIG. 1 is an illustration of a finite element analysis (FEA) system, in accordance with example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to finite element analysis of a structural product composed of a plurality of structural components. Example implementations will be primarily described in conjunction with aerospace applications in which the product may be an aircraft composed of component parts such as materials, components, assemblies and sub-assemblies. In other examples, the product may be an assembly or sub-assembly of an aircraft, which assembly or sub-assembly may itself be composed of structural components. It should be understood, however, that example implementations may be utilized in conjunction with a variety of other applications, both in the aerospace industry and outside of the aerospace industry.

Referring now to FIG. 1, a finite element analysis (FEA) system 100 is illustrated according to example implementations of the present disclosure. The FEA system may be configured to perform a number of different functions or operations, either automatically, under direct operator control, or some combination of thereof. In this regard, the FEA system may be configured to perform one or more of its functions or operations automatically, that is, without being directly controlled by an operator such as a security architect that may be assigned to model and analyze cybersecurity threats in the complex-system platform. Additionally or alternatively, the FEA system may be configured to perform one or more of its functions or operations under direct operator control.

The FEA system 100 may include one or more of each of a number of different subsystems (each an individual system) coupled to one another for performing one or more functions or operations. As shown in FIG. 1, for example, the FEA system may include a pre-processing system 102, processing system 104 and/or post-processing system 106 that may be coupled to one another. Although shown as part of the FEA system, one or more of the pre-processing system, processing system and/or post-processing system may instead be separate from but in communication with the FEA system. It should also be understood that one or more of the subsystems may function or operate as a separate system without regard to others of the subsystems. And further, it should be understood that the FEA system may include one or more additional or alternative subsystems than those shown in FIG. 1.

The pre-processing system 102 may be generally configured to develop an appropriate computer model of a structural product, sometimes referred to as a finite element model. For its operations, the pre-processing system may include or otherwise benefit from commercially-available software tools. Examples of suitable software tools include computer-aided design (CAD) systems, such as CATIA, SolidWorks or the like, available from Dassault Systèmes S.A. of Vélizy-Villacoublay, France. Other examples of suitable software tools include Altair Hypermesh, available from Altair Engineering, Inc. of Troy, Mich.; PATRAN, available from MSC Software Corporation of Newport Beach, Calif.; the ANSYS software suite, available from ANSYS, Inc. of Canonsburg, Pa.; HyperSizer®, available from Collier Research Corporation of Newport News, Va.; GENESIS, available from Vanderplaats R&D, Inc. of Colorado Springs, Colo.; and the like.

The processing system 104 may be generally configured to perform a finite element analysis of the structural product from the finite element model. The processing system may be configured to derive and solve governing matrix equations from the finite element model. The post-processing system 106 may then be configured to check the validity of the solutions from the processing system (e.g., displacements, stresses, specialized stresses, error indicators); and in some examples, the post-processing system may to perform at least one other appropriate analysis on the finite element model and/or solutions. For their operations, the processing system and post-processing system may include or otherwise benefit from commercially-available software tools such as Abaqus, available from Dassault Systèmes S.A.; the ANSYS software suite (Fluent); NASTRAN/PATRAN, available from MSC Software Corporation; SolidWorks (COSMOSworks), COMSOL Multiphysics® (FEMLAB), available from COMSOL Inc. of Burlington, Mass.; GENESIS; Altair HyperView, available from Altair Engineering, Inc.; NX (Unigraphics), available from Siemens PLM Software of Plano, Tex.; TAK 2000, available from K&K Associates of Westminster, Colo.; SolidWorks; Pro/ENGINEER, available from PTC Inc. of Needham, Mass.; LS-DYNA®, available from Livermore Software Technology Corporation (LSTC) of Livermore, Calif.; and the like.

Figure 2:
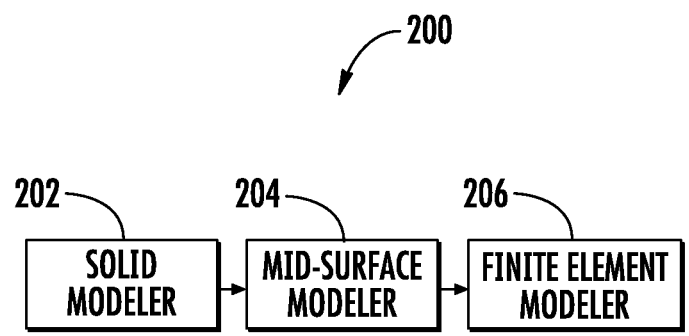
FIG. 2 is an illustration of a suitable pre-processing system, in accordance with example implementations of the present disclosure.

FIG. 2 illustrates a pre-processing system 200, which in some examples implementations may correspond to the pre-processing system 102 of FIG. 1. As shown in FIG. 2, for example, the pre-processing system may include subsystems (each an individual system) such as a solid modeler 202, mid-surface modeler 204 and/or finite element modeler 206 that may be coupled to one another. Similar to the FEA system 100 of FIG. 1, although shown as part of the pre-processing system, one or more of the solid modeler, mid-surface modeler and/or finite element modeler may instead be separate from but in communication with the pre-processing system. It should also be understood that one or more of the subsystems may function or operate as a separate system without regard to others of the subsystems. And further, it should be understood that the pre-processing system may include one or more additional or alternative subsystems than those shown in FIG. 2.

The solid modeler 202 may be generally configured to develop a solid model of the structural product, the solid model sometimes referred to as a digital three-dimensional (3D) model. The solid model may represent the product and its structural components by a collection of geometry. For example, the solid model may represent the product and its components as a collection of computer-graphics primitives such as edges, faces, points (e.g., vertices) and the like, which may be arranged into polygons or other arithmetically-derived structures to reflect the 3D geometry of the respective product and its components, including their surfaces, volumes or parts. The product may be defined by a "boundary" representation, or collection of polygons that demarcate the space occupied by the product, which may include sub-collections of polygons that demarcate spaces occupied by respective components of the product. For some products, the solid model may use hundreds of thousands of polygons. For development of the solid model, the solid modeler may include or otherwise benefit from tools such as the aforementioned CATIA digital modeling system.

The finite element modeler 206 may be configured to generate a finite element model for the structural product from the solid model. This may include, for example, the finite element modeler being configured to create a finite element mesh to divide the product's geometry into subdomains for mathematical analysis, and apply material properties and boundary conditions to this geometry. For generation of the finite element model, the finite element modeler may include or otherwise benefit from tools such as one or more of those identified above.

As explained in the background section, whereas a finite element model (e.g., finite element mesh) of a structure can be generated directly from a solid model of the structure. But for a number of structures, the solid model is unduly complex and requires excessive computing resources to generate a corresponding finite element model. In some instances, an intermediate mid-surface model of the structure may be generated from the solid model, and this mid-surface model may then be used to generate the corresponding finite element model. But even in these instances, manual techniques for generating the mid-surface model often require an excessive amount of time; and other, automated techniques often produce inaccurate results that require excessive manual correction.

The mid-surface modeler 204 of example implementations may therefore be configured to receive the solid model of the structural product from the solid modeler 202, automatically generate a mid-surface model of a mid-surface model of the product from the solid model, and communicate the mid-surface model to the finite element modeler 206. In this regard, the mid-surface model generated by the mid-surface modeler may be a complete mid-surface model, or the mid-surface model may be a substantial portion of a complete mid-surface model, which may be further and less substantially modified to thereby complete it. The finite element modeler, then, may be configured to generate the finite element model for the structural product from the mid-surface model (and thereby indirectly from the solid model).

Figure 3:
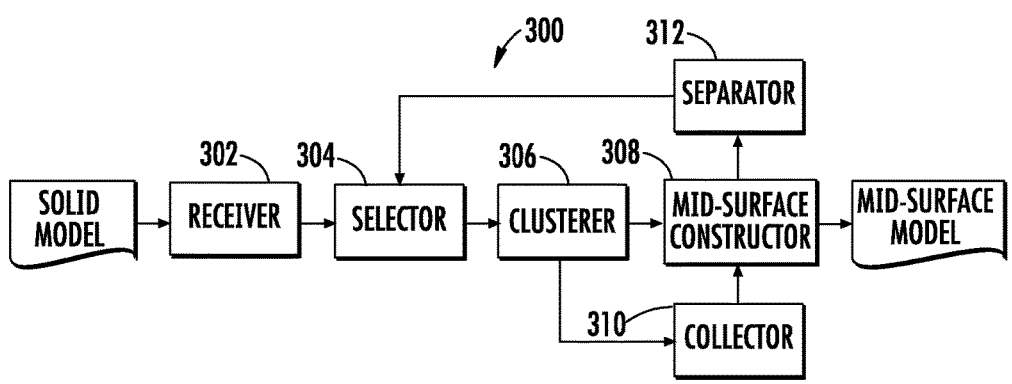
FIG. 3 is an illustration of a suitable mid-surface modeler, in accordance with example implementations of the present disclosure.

FIG. 3 illustrates a mid-surface modeler 300, which in some examples implementations may correspond to the mid-surface modeler 204 of FIG. 2. As shown in FIG. 3, for example, the pre mid-surface modeler may include subsystems (each an individual system) such as a receiver 302, selector 304, clusterer 306 and/or mid-surface constructor 308 that may be coupled to one another. Once again, although shown as part of the mid-surface modeler, one or more of the receiver, selector, clusterer and/or mid-surface constructor may instead be separate from but in communication with the mid-surface modeler. It should also be understood that one or more of the subsystems may function or operate as a separate system without regard to others of the subsystems. And further, it should be understood that the mid-surface modeler may include one or more additional or alternative subsystems than those shown in FIG. 3.

The receiver 302 may be configured to receive a solid model of a structural product composed of a plurality of structural components, with the solid model representing the plurality of structural components by a collection of geometry. The selector 304 may be configured to select a group of geometry from the geometry in the solid model, with the group of geometry having approximately the same shape and being perpendicular to an axis of a local coordinate system in which the solid model is defined. In some examples, this geometry may be planar and perpendicular to the axis of the local coordinate system. The local coordinate system may include $N \geq 1$ axes. Up to three of these axes may be orthogonal to one another, but the local coordinate system may include an even greater number of axes that may not be orthogonal to one of the three orthogonal axes. The axis for which the geometry is grouped may be any of these axes, orthogonal or non-orthogonal in the local coordinate system.

The clusterer 306 may be configured to cluster geometry of the group of geometry into one or more clusters of geometry based on a relationship between the geometry, with each cluster of the cluster(s) representing a structural component of the structural component(s). The relationship may be proximity, or in other examples, the relationship may be based on similarities of one or more of their features such as their surface normal, orientation, shape, curvature, extent/size, spatial location or the like. The mid-surface constructor

308, then, may be configured to construct a mid-surface model of the structural product, including the mid-surface constructor being configured to compute respective one or more mid-surfaces for the cluster(s). For each cluster of the cluster(s) of geometry, for example, the mid-surface constructor 308 may be being configured to compute the geometry of the cluster.

In some instances, some of the geometry in a cluster may be inappropriate for the cluster, such as in the case of geometry not being for the structural component represented by the cluster. In these instances, the mid-surface constructor 308 may reject this geometry as being inappropriate, before computing the mid-surface for the cluster. The determination of geometry as being inappropriate may be made in a number of different manners, such as in response to various rules against which the geometry may be compared, and which may depend on the specific structural product and/or its components.

Further, in some instances, the structural component represented by a cluster of geometry may include further geometry not captured in the group of geometry from which the cluster came. This may be the case, for example, for geometry of a structural component that does not have the same shape (e.g., is not planar) or is not perpendicular to the same axis as other geometry of the respective component. To account for this additional geometry, the mid-surface modeler 300 may in some examples further include a collector 310 configured to collect additional geometry from the geometry in the solid model based on a relationship between the cluster(s) and additional geometry. Similar to before, the relationship may be proximity, or in other examples, the relationship may be based on similarities of one or more of their features such as their surface normal, orientation, shape, curvature, extent/size, spatial location or the like. The additional geometry may represent another portion of one or more structural components represented by the geometry of the clusters, or may represent another structural component.

The mid-surface constructor 308 may be configured to add an outline for the additional geometry to the respective mid-surface(s), the mid-surface model now including the respective mid-surfaces and outline. The mid-surface constructor may add the outline for the additional geometry in a number of different manners. For example, the mid-surface constructor may be configured to generate a projection of the additional geometry from the solid model onto a workspace of the mid-surface model including the respective mid-surface(s), with the projection being composed of a plurality of geometric shapes. The mid-surface constructor may then compute the union of the geometric shapes (e.g., by union of the projections onto the workspace in spline geometry parameter space) to obtain the outline for the additional geometry; and in some examples, the mid-surface constructor may further trim the mid-surface model by the union.

In some examples, the mid-surface modeler 300 may act on the solid model for each of a plurality of axes of the local coordinate system. In these examples, the selector 304 and clusterer 306 may be configured to select the group and cluster geometry of the group into cluster(s) of geometry for each axis. And the mid-surface modeler may be configured to construct the mid-surface model including computation of respective mid-surface(s) for the cluster(s) for each axis.

The mid-surface modeler 300 may be configured to process the geometry for the different axes in any of a number of different manners. For example, consider the group of geometry as a first group of geometry perpendicular to the axis being a first axis of the local coordinate system, and the respective mid-surface(s) as first respective mid-surface(s). The mid-surface modeler may further include a separator 312 configured to remove the first group of geometry from the geometry in the solid model to produce a resulting solid model. The selector 304, then, may be further configured to select a second group of geometry from geometry in the resulting solid model, with the second group of geometry having approximately the same shape (e.g., planar) and perpendicular to a second axis of the local coordinate system.

The clusterer 306 may be further configured to cluster geometry of the second group of geometry into a second one or more clusters of geometry based on a relationship between the geometry. Similar to before, the collector 310 may be configured to collect second additional geometry from the geometry in the resulting solid model based on a relationship between the second cluster(s) and second additional geometry. The mid-surface constructor 308 may be further configured to further construct the mid-surface model of the structural product. This may include the mid-surface constructor being configured to compute second respective mid-surface(s) for the second cluster(s), with the mid-surface model including the first respective mid-surface(s) and second respective mid-surface(s). And the mid-surface constructor may be configured to add an outline for the second additional geometry to the respective mid-surface(s).

Returning to FIG. 2, the mid-surface model may be provided to the finite element modeler 206, which may be configured to generate a finite element model from the mid-surface model. And stepping back to FIG. 1, the finite element model may be provided to the processing system 102, which may be configured to perform a finite element analysis of the structural product from the finite element model.

In some more particular examples, the mid-surface model or its subsequent finite element model may be provided to a lofting tool, which may be part of or separate from the processing system 102. The lofting tool may be configured to calculate gauges for the mid-surfaces and outlines of the mid-surface model, and reloft the mid-surface model based on the calculated gauges. The lofting tool may then reassemble the gauged mid-surfaces for the structural components to reproduce a solid model of the structural product. This reproduced solid model may be used for any of a number of different purposes, such as further computer-aided design/computer-aided manufacturing (CAD/CAM) processes.

Figure 4:
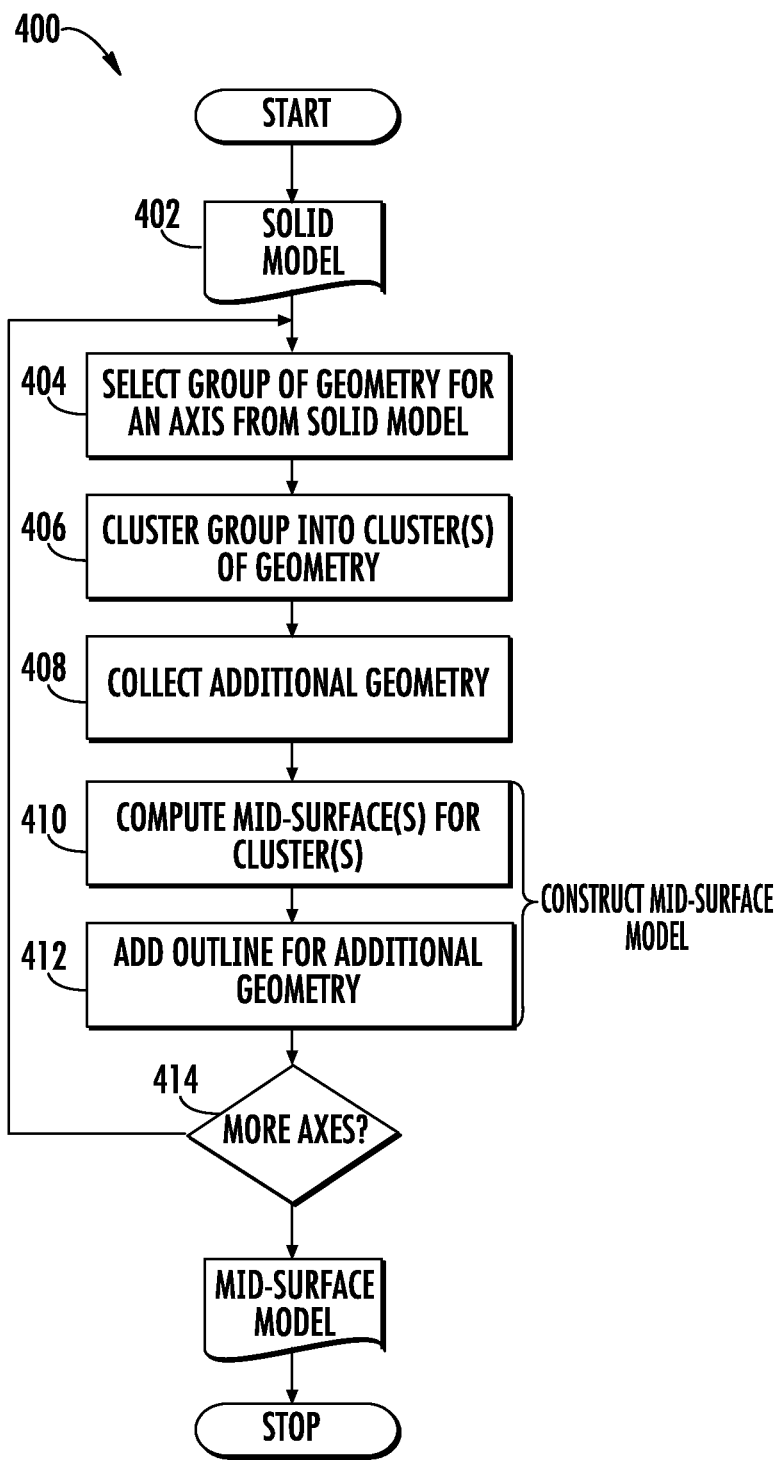
FIG. 4 illustrates a flowchart including various operations in a method according to example implementations of the present disclosure.

Reference is now made to FIG. 4, which illustrates a flowchart including various operations in a method 400 according to example implementations of the present disclosure; and to FIGS. 5-8 which depict models of an aircraft hinge beam at various stages of process. As shown at block 402, the method of these examples includes receiving a solid model of a structural product composed of a plurality of structural components, with the solid model representing the plurality of structural components by a collection of geometry. The method includes selecting a group of geometry from the geometry in the solid model, with the group of geometry having approximately the same shape, and being and perpendicular to an axis of a local coordinate system in which the solid model is defined, as shown at block 404. The method includes clustering geometry of the group of geometry into one or more clusters of geometry based on a relationship between the geometry, with each cluster of the one or more clusters representing a structural component of the one or more structural components, as shown in block 406. In some examples, the method may include collecting additional geometry from the geometry in the solid model based on a relationship between the one or more clusters and additional geometry, as shown in block 408.

Figure 5:
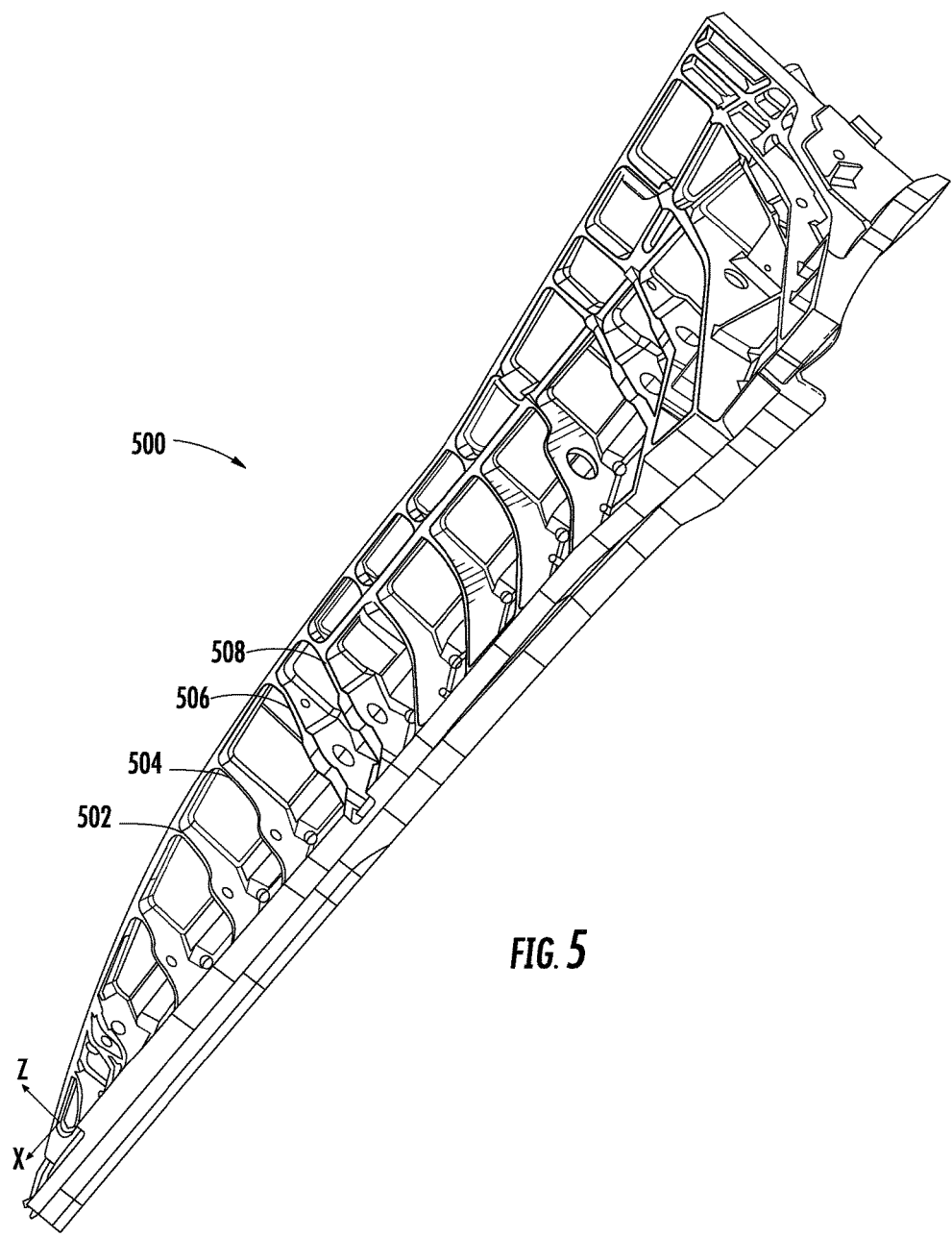
FIGS. 5-8 depict example models of a hinge beam an aircraft at various stages of process by a mid-surface modeler, according to some example implementations of the present disclosure.
Figure 6:
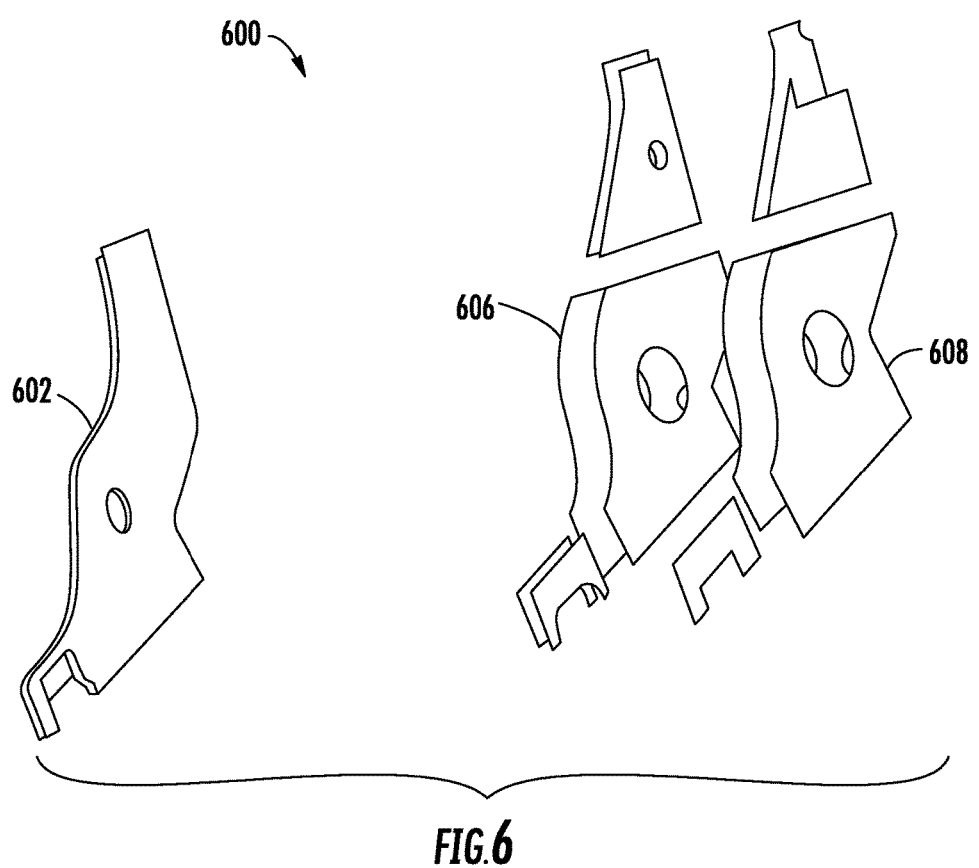

FIG. 5 illustrates an example of a solid model of an aircraft hinge beam 500 (structural product) including ribs (four identified as ribs 502, 504, 506 and 508), stiffeners and the like (structural components). FIG. 6 illustrates a group of geometry 600 that may be selected and clustered into clusters 602, 606 and 608, which may be geometry for three of the ribs 502, 506 and 508 of the aircraft hinge beam. In these examples, additional geometry may be collected for the rib 504 located between ribs of the other three ribs based on the spatial location of the geometry for that rib relative to the clusters of geometry for the other ribs.

The method may include constructing a mid-surface model of the structural product including computing respective one or more mid-surfaces for the one or more clusters, as shown in block 410. In examples in which additional geometry is collected, constructing the mid-surface model may include adding an outline for the additional geometry to the respective one or more mid-surfaces, as shown in block 412. And as described above, steps of the method may be repeated for each axis of a plurality of axes (e.g., three axes) of the local coordinate system, and construction of the mid-surface model may include computing respective one or more mid-surfaces for the one or more clusters for each axis, as shown at block 414.

Figure 7:
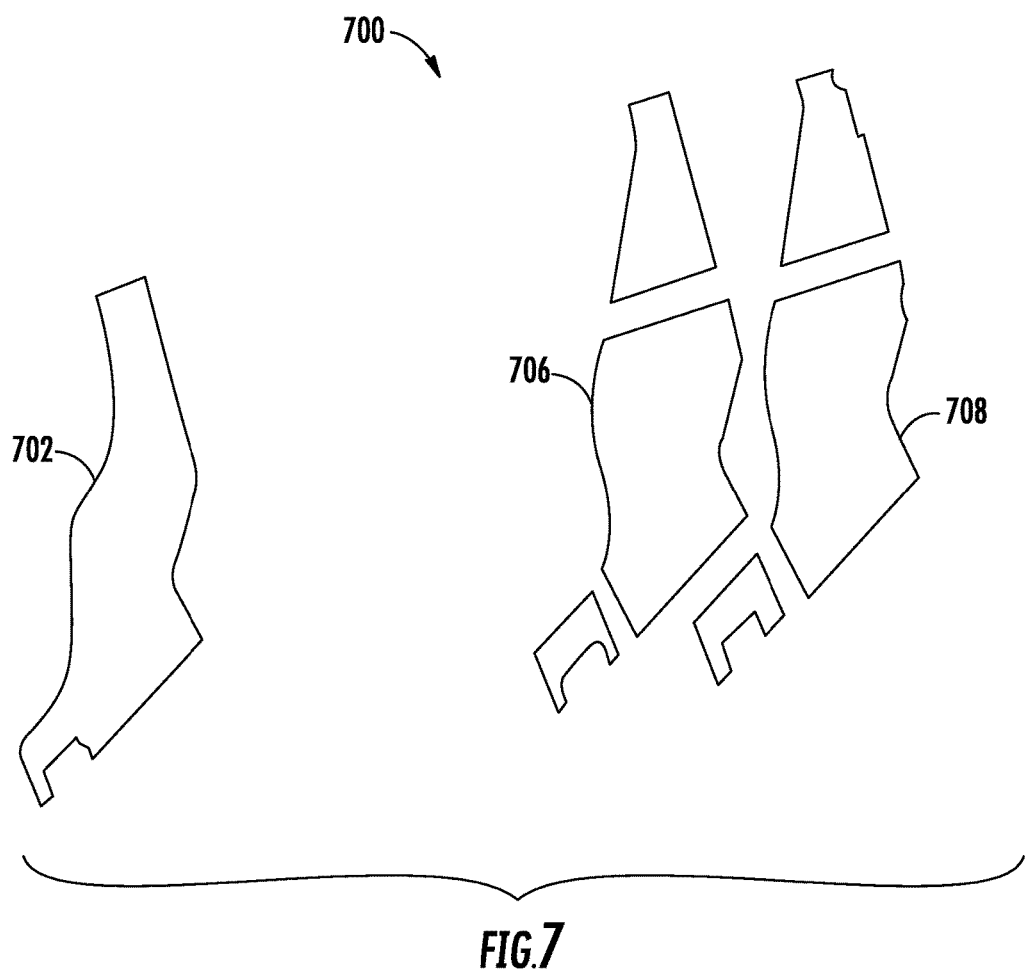
Figure 8:
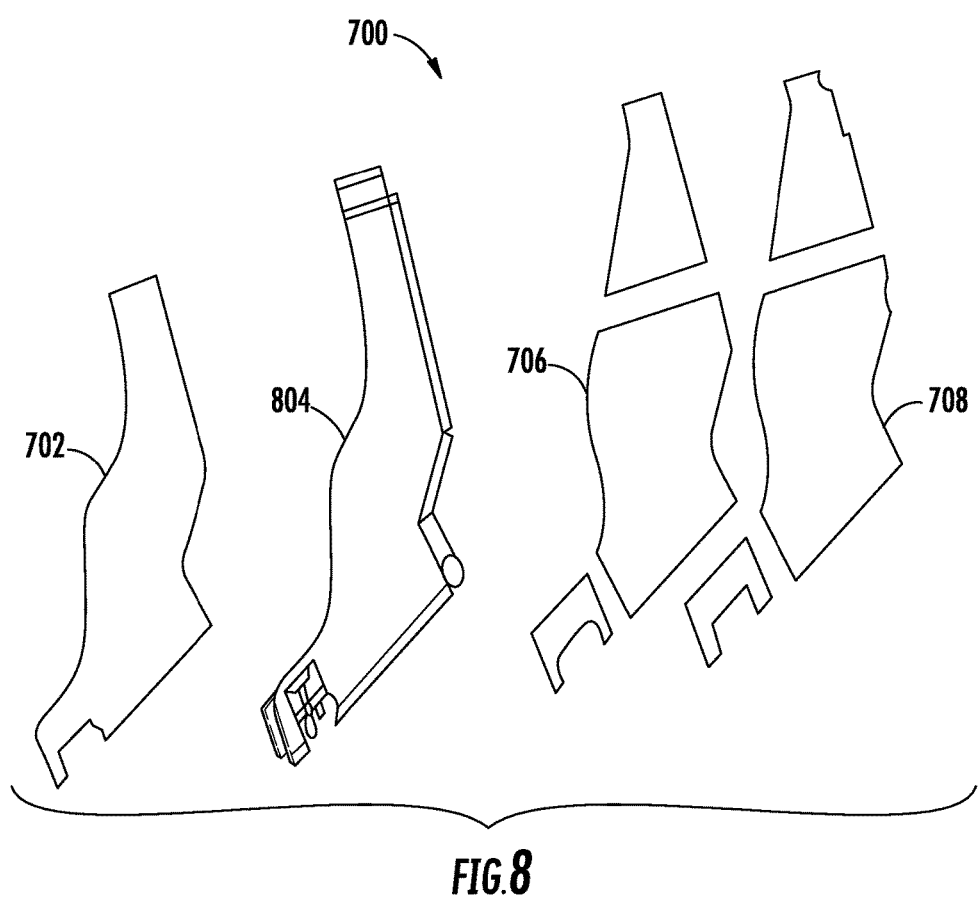

FIG. 7 continues the example of FIGS. 5 and 6, and illustrates a mid-surface model 700 at one stage of construction, including respective mid-surfaces 702, 706 and 708 computed for clusters 602, 606 and 608. FIG. 8 then illustrates an intermediate stage of adding the outline for the additional geometry of rib 504. That is, FIG. 8 illustrates a projection 804 for the additional geometry, which may be added to a workspace including the mid-surfaces. As explained above, the union of the geometric shapes of this projection may then be computed to obtain the outline for the additional geometry, and thus rib 504.

According to example implementations of the present disclosure, the FEA system 100 and its subsystems including the pre-processing system 102, processing system 104 and post-processing system 106 may be implemented by various means. Similarly, the examples of a processing system 200 and mid-surface modeler 300, including each of their respective elements, may be implemented by various means according to example implementations. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wired or wireless network or the like.

Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory (of the same or another apparatus).

The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of computer hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of a finite element analysis system, the apparatus comprising:
   a processor and a memory storing executable instructions that in response to execution by the processor cause the apparatus to at least:
   develop a finite element model of a structural product composed of a plurality of structural components, including the apparatus being caused to at least:
      receive a solid model of the structural product, the solid model representing the plurality of structural components by a collection of geometry;
      select an axis of a local coordinate system in which the solid model is defined;
      select, from the geometry in the solid model, a group of geometry having approximately the same shape and perpendicular to the axis, the group of geometry including geometry for multiple ones of the plurality of structural components;
      cluster the geometry of the group of geometry into clusters of geometry based on a relationship between the geometry, each cluster of the clusters representing a structural component of the multiple ones of the plurality of structural components;
      construct a mid-surface model of the structural product, including the apparatus being caused to compute respective mid-surfaces for the clusters; and
      generate the finite element model from the mid-surface model and thereby indirectly from the solid model; and
   perform a finite element analysis of the structural product from the finite element model.

2. The apparatus of claim 1, wherein the apparatus being caused to compute the respective one or more mid-surfaces includes for each cluster of the clusters of geometry, being caused to determine an average of the geometry of the cluster.

3. The apparatus of claim 1, wherein the apparatus being caused to develop the finite element model includes the apparatus being caused to further:
   collect additional geometry from the geometry in the solid model based on a relationship between the clusters and the additional geometry, and
   wherein the apparatus being caused to construct the mid-surface model includes being caused to add an outline for the additional geometry to the respective mid-surfaces.

4. The apparatus of claim 3, wherein the apparatus being caused to add the outline for the additional geometry includes being caused to:
   generate a projection of the additional geometry from the solid model onto a workspace of the mid-surface model including the respective mid-surfaces, the projection being composed of a plurality of geometric shapes; and
   compute a union of the plurality of geometric shapes to obtain the outline for the additional geometry.

5. The apparatus of claim 1, wherein the apparatus is caused to select each axis of a plurality of axes of the local coordinate system, and separately for each axis, select the group of geometry and cluster the geometry of the group into clusters of geometry, and
   wherein the apparatus being caused to construct the mid-surface model includes being caused to compute respective mid-surfaces for the clusters for each axis.

6. An apparatus for implementation of a finite element analysis system, the apparatus comprising:
   a processor and a memory storing executable instructions that in response to execution by the processor cause the apparatus to at least:
   develop a finite element model of a structural product composed of a plurality of structural components, including the apparatus being caused to at least;
      receive a solid model of the structural product, the solid model representing the plurality of structural components by a collection of geometry;
      select a group of geometry from the geometry in the solid model, the group of geometry having approximately the same shape, and being perpendicular to an axis of a local coordinate system in which the solid model is defined;
      cluster geometry of the group of geometry into one or more clusters of geometry based on a relationship between the geometry, each cluster of the one or more clusters representing a structural component of the one or more structural components;
      construct a mid-surface model of the structural product, including the apparatus being caused to compute respective one or more mid-surfaces for the one or more clusters; and
      generate the finite element model from the mid-surface model and thereby indirectly from the solid model; and
   perform a finite element analysis of the structural product from the finite element model,
   wherein the group of geometry is a first group of geometry perpendicular to the axis being a first axis of the local coordinate system, and the respective one or more mid-surfaces are first respective one or more mid-surfaces, and wherein the apparatus being caused to develop the finite element model includes the apparatus being caused to further:
      remove the first group of geometry from the geometry in the solid model to produce a resulting solid model;
      select a second group of geometry from geometry in the resulting solid model, the second group of geometry having approximately the same shape, and being perpendicular to a second axis of the local coordinate system;
      cluster geometry of the second group of geometry into a second one or more clusters of geometry based on a relationship between the geometry; and
      further construct the mid-surface model of the structural product, including the apparatus being caused to compute second respective one or more mid-surfaces for the second one or more clusters, the mid-surface model including the first respective one or more mid-surfaces and second respective one or more mid-surfaces.

7. A method of finite element analysis comprising:
   developing a finite element model of a structural product composed of a plurality of structural components, including at least:
      receiving a solid model of the structural product, the solid model representing the plurality of structural components by a collection of geometry;
      selecting an axis of a local coordinate system in which the solid model is defined;
      selecting, from the geometry in the solid model, a group of geometry having approximately the same shape and perpendicular to the axis, the group of geometry including geometry for multiple ones of the plurality of structural components;
      clustering the geometry of the group of geometry into clusters of geometry based on a relationship between the geometry, each cluster of the clusters representing a structural component of the multiple ones of the plurality of structural components;
      constructing a mid-surface model of the structural product including computing respective mid-surfaces for the clusters; and
      generating the finite element model from the mid-surface model and thereby indirectly from the solid model; and
   performing a finite element analysis of the structural product from the finite element model.

8. The method of claim 7, wherein computing the respective mid-surfaces includes for each cluster of the clusters of geometry, determining an average of the geometry of the cluster.

9. The method of claim 7, wherein developing the finite element model further includes:
   collecting additional geometry from the geometry in the solid model based on a relationship between the clusters and the additional geometry, and
   wherein constructing the mid-surface model includes adding an outline for the additional geometry to the respective mid-surfaces.

10. The method of claim 9, wherein adding the outline for the additional geometry includes:
   generating a projection of the additional geometry from the solid model onto a workspace of the mid-surface model including the respective mid-surfaces, the projection being composed of a plurality of geometric shapes; and
   computing a union of the plurality of geometric shapes to obtain the outline for the additional geometry.

11. The method of claim 7, wherein selecting an axis includes selecting each axis of a plurality of axes of the local coordinate system, and selecting the group of geometry and clustering the geometry of the group into one or more clusters of geometry are performed separately for each axis, and
   wherein constructing the mid-surface model includes computing respective mid-surfaces for the clusters for each axis.

12. A method of finite element analysis comprising:
   developing a finite element model of a structural product composed of a plurality of structural components, including at least:
      receiving a solid model of the structural product, the solid model representing the plurality of structural components by a collection of geometry;
      selecting a group of geometry from the geometry in the solid model, the group of geometry having approximately the same shape, and being perpendicular to an axis of a local coordinate system in which the solid model is defined;
      clustering geometry of the group of geometry into one or more clusters of geometry based on a relationship between the geometry, each cluster of the one or more clusters representing a structural component of the one or more structural components;

constructing a mid-surface model of the structural product including computing respective one or more mid-surfaces for the one or more clusters; and generating the finite element model from the mid-surface model and thereby indirectly from the solid model; and performing a finite element analysis of the structural product from the finite element model, wherein the group of geometry is a first group of geometry perpendicular to the axis being a first axis of the local coordinate system, and the respective one or more mid-surfaces are first respective one or more mid-surfaces, and wherein developing the finite element model further includes:

removing the first group of geometry from the geometry in the solid model to produce a resulting solid model; and thereafter, selecting a second group of geometry from geometry in the resulting solid model, the second group of geometry having approximately the same shape, and being perpendicular to a second axis of the local coordinate system;

clustering geometry of the second group of geometry into a second one or more clusters of geometry based on a relationship between the geometry; and further constructing the mid-surface model of the structural product including computing second respective one or more mid-surfaces for the second one or more clusters, the mid-surface model including the first respective one or more mid-surfaces and second respective one or more mid-surfaces.

13. A computer-readable storage medium for implementation of a finite element analysis system, the computer-readable storage medium being non-transitory and having computer-readable program code portions stored therein that in response to execution by a processor, cause an apparatus to at least:

develop a finite element model of a structural product composed of a plurality of structural components, including the apparatus being caused to at least:

receive a solid model of the structural product, the solid model representing the plurality of structural components by a collection of geometry;

select an axis of a local coordinate system in which the solid model is defined;

select, from the geometry in the solid model, a group of geometry having approximately the same shape and perpendicular to the axis, the group of geometry including geometry for multiple ones of the plurality of structural components;

cluster the geometry of the group of geometry into clusters of geometry based on a relationship between the geometry, each cluster of the clusters representing a structural component of the multiple ones of the plurality of structural components;

construct a mid-surface model of the structural product, including the apparatus being caused to compute respective mid-surfaces for the clusters; and generate the finite element model from the mid-surface model and thereby indirectly from the solid model; and perform a finite element analysis of the structural product from the finite element model.

14. The computer-readable storage medium of claim 13, wherein the apparatus being caused to compute the respective mid-surfaces includes for each cluster of the clusters of geometry, being caused to determine an average of the geometry of the cluster.

15. The computer-readable storage medium of claim 13, wherein the apparatus being caused to develop finite element model includes the apparatus being caused to further:

collect additional geometry from the geometry in the solid model based on a relationship between the one or more clusters and the additional geometry, and wherein the apparatus being caused to construct the mid-surface model includes being caused to add an outline for the additional geometry to the respective mid-surfaces.

16. The computer-readable storage medium of claim 15, wherein the apparatus being caused to add the outline for the additional geometry includes being caused to:

generate a projection of the additional geometry from the solid model onto a workspace of the mid-surface model including the respective mid-surfaces, the projection being composed of a plurality of geometric shapes; and compute a union of the plurality of geometric shapes to obtain the outline for the additional geometry.

17. The computer-readable storage medium of claim 13, wherein the apparatus is caused to select each axis of a plurality of axes of the local coordinate system, and separately for each axis, select the group of geometry and cluster the geometry of the group into clusters of geometry, and wherein the apparatus being caused to construct the mid-surface model includes being caused to compute respective mid-surfaces for the clusters for each axis.

18. A computer-readable storage medium for implementation of a finite element analysis system, the computer-readable storage medium being non-transitory and having computer-readable program code portions stored therein that in response to execution by a processor, cause an apparatus to at least:

develop a finite element model of a structural product composed of a plurality of structural components, including the apparatus being caused to at least:

receive a solid model of the structural product, the solid model representing the plurality of structural components by a collection of geometry;

select a group of geometry from the geometry in the solid model, the group of geometry having approximately the same shape, and being perpendicular to an axis of a local coordinate system in which the solid model is defined;

cluster geometry of the group of geometry into one or more clusters of geometry based on a relationship between the geometry, each cluster of the one or more clusters representing a structural component of the one or more structural components;

construct a mid-surface model of the structural product, including the apparatus being caused to compute respective one or more mid-surfaces for the one or more clusters; and generate the finite element model from the mid-surface model and thereby indirectly from the solid model; and perform a finite element analysis of the structural product from the finite element model, wherein the group of geometry is a first group of geometry perpendicular to the axis being a first axis of the local coordinate system, and the respective one or more mid-surfaces are first respective one or more mid-surfaces, and wherein the apparatus being caused to develop the finite element model includes the apparatus being cause to further:
remove the first group of geometry from the geometry in the solid model to produce a resulting solid model;
select a second group of geometry from geometry in the resulting solid model, the second group of geometry having approximately the same shape, and being perpendicular to a second axis of the local coordinate system;
cluster geometry of the second group of geometry into a second one or more clusters of geometry based on a relationship between the geometry; and
further construct the mid-surface model of the structural product, including the apparatus being caused to compute second respective one or more mid-surfaces for the second one or more clusters, the mid-surface model including the first respective one or more mid-surfaces and second respective one or more mid-surfaces.

19. The apparatus of claim 1, further comprising a lofting tool configured to calculate gauges, wherein based on the finite element analysis, the finite element model is provided to the lofting tool to calculate gauges for the mid-surfaces, reloft the mid-surface model based on the calculated gauges, and reassemble the gauged mid-surfaces for the structural components to reproduce a solid model of the structural product for use for computer-aided manufacturing (CAD/CAM) processes.

20. The method of claim 12, further comprising the step of providing the finite element model to a lofting tool, and based on the finite element analysis, using the lofting tool to calculate gauges for the mid-surfaces, reloft the mid-surface model based on the calculated gauges, and reassemble the gauged mid-surfaces for the structural components to reproduce a solid model of the structural product, for use for computer-aided manufacturing (CAD/CAM) processes.

* * * * *